US006085071A

United States Patent [19]

Yamada et al.

[11] Patent Number: 6,085,071

[45] Date of Patent: Jul. 4, 2000

[54] ANTENNA DUPLEXER

[75] Inventors: Toru Yamada, Katano; Yukihiro Takeda, Kashihara; Masaki Kita, Kyoto; Hideyuki Miyake, Matsubara; Toshio Ishizaki, Kobe; Makoto Fujikawa, Ikoma; Hideki Hayama, Yokohama, all of Japan

[73] Assignee: Matsushita Electric Industrial Co., Ltd., Osaka, Japan

[21] Appl. No.: 09/041,110

[22] Filed: Mar. 12, 1998

[30] Foreign Application Priority Data

Mar. 12, 1997 [JP] Japan .................................... 9-057307
Dec. 25, 1997 [JP] Japan .................................... 9-357063

[51] Int. Cl.[7] ........................................................ H04B 1/46
[52] U.S. Cl. ................................ 455/82; 455/83; 333/126
[58] Field of Search ................................. 455/73, 82, 83, 455/78, 80, 129, 269; 333/101, 103, 126, 129, 132

[56] References Cited

U.S. PATENT DOCUMENTS 4,080,601 3/1978 Alcorn, Jr. .............................. 370/339
5,193,218 3/1993 Shimo ....................................... 455/80
5,374,906 12/1994 Noguchi et al. ........................ 333/134
5,442,812 8/1995 Ishizaki et al. ........................... 455/82
5,534,829 7/1996 Kobayashi et al. ...................... 333/126
5,909,641 6/1999 Simmons .................................. 455/78
5,911,116 6/1999 Nosswitz .................................. 455/83

FOREIGN PATENT DOCUMENTS 63090901 4/1988 Japan .
07336267 12/1995 Japan .

*Primary Examiner*—Dwayne D. Bost
*Assistant Examiner*—Erika A. Gary
*Attorney, Agent, or Firm*—Smith, Gambrell & Russell, LLP

[57] ABSTRACT

An antenna duplexer has a transmission input terminal, a receiving output terminal, an antenna terminal in which a transmission output terminal and a receiving input terminal are used in common, a transmission filter having at least one resonance element set between the transmission input terminal and the transmission output terminal and coupled by a coupling element, a receiving filter having at least one resonance element set between the receiving output terminal and said receiving input terminal and coupled by a coupling element, and an impedance variable element connected to the resonance element of the transmission filter and the resonance element of said receiving filter respectively in parallel, wherein the frequency transfer characteristic of the transmission filter and the frequency transfer characteristic of the receiving filter are controlled by applying control signals and thereby changing the impedances of the impedance variable element.

23 Claims, 12 Drawing Sheets

Fig. 6

Second-order harmonic level

| | | Transmission input level | |
|---|---|---|---|
| | | 30dBm | 35dBm |
| Control terminal state | OPEN | Unmeasurable | 72dBc |
| | -3V | 68dBc | 66dBc |

ANTENNA DUPLEXER

BACKGROUND OF THE INVENTION

1. Field of the Invention

The present invention relates to an antenna duplexer mainly used for a high-frequency circuit or the like of a radio system to share an antenna by a transmitter and a receiver.

2. Description of the Prior Art

Because mobile communication has recently advanced, an antenna duplexer is used for a lot of portable telephones and automobile telephones. An example of the above conventional antenna duplexer is described below while referring to the accompanying drawings.

FIG. 13 shows an exploded perspective view of a conventional antenna duplexer. In FIG. 13, symbols 1301 to 1306 denote dielectric coaxial resonators, 1307 denotes a coupling board, 1308 denotes a metallic case, 1309 denotes a metallic cover, 1310 to 1312 denote series capacitors, 1313 and 1314 denote inductors, 1315 to 1318 denote coupling capacitors, 1321 to 1326 denote coupling pins, 1331 denotes a transmission (hereafter TX) terminal, 1332 denotes an antenna terminal, 1333 denotes a receiving (hereafter RX) terminal, and 1341 to 1347 denote electrode patterns formed on the coupling board 1307.

The dielectric coaxial resonators 1301, 1302, and 1303 and the series capacitors 1310, 1311, and 1312, and inductors 1313 and 1314 constitute a TX band rejection filter. Moreover, the dielectric coaxial resonators 1304, 1305, and 1306 and coupling capacitors 1315, 1316, 1317, and 1318 constitute a RX band pass filter.

One end of a TX filter is connected to the TX terminal 1331 electrically connected with a transmitter and the other end of the TX filter is connected with one end of a RX filter and also connected to the antenna terminal 1332 electrically connected to an antenna. The other end of the RX filter is connected to the RX terminal 1333 electrically connected with a receiver.

Operations of the antenna duplexer constituted as described above are described below.

First, the TX band rejection filter shows a small insertion loss for a TX signal in a TX frequency band and makes it possible to transfer the TX signal from the TX terminal 1331 to the antenna terminal 1332 almost without attenuating the TX signal. Moreover, the TX band rejection filter shows an operation that RX signals input through the antenna terminal 1332 return to the RX band pass filter because the TX band rejection filter shows a large insertion loss for the RX signals in a RX frequency band and most input signals in the RX frequency band are reflected.

However, the RX band pass filter shows a small insertion loss for a RX signal in a RX frequency band and makes it possible to transfer the RX signal from the antenna terminal 1332 to the RX terminal 1333 almost without attenuating the RX signal. Moreover, the RX band pass filter shows an operation that TX signals coming through a TX filter are sent to the antenna terminal 1332 because the RX band pass filter shows a large insertion loss for TX signals in a TX frequency band and most input signals in the TX frequency band are reflected.

An antenna duplexer used for a high-frequency band of mobile communication has wide band characteristics. Therefore, to secure a necessary attenuation value in a wide band, it is necessary to further increase the number of stages of cascaded dielectric coaxial resonators.

In the case of the above structure, however, when the number of stages of resonators is increased to increase the attenuation value, the loss in a signal pass band width increases. To avoid the bad effect, it is considered to increase the unloaded Q of a dielectric coaxial resonator. However, to increase the unloaded Q, it is necessary to increase the size of the dielectric coaxial resonator. This is reciprocal to the recent antenna-duplexer downsizing trend.

BRIEF SUMMARY OF THE INVENTION

The present invention is made to solve the above problems and its object is to provide an antenna duplexer having a large attenuation value and a small loss without increasing the size of the unit.

According to the above structure, the present invention makes it possible to make a TX filter and a RX filter synchronously variable by external control by adding a switching element or variable capacitive element to the TX and RX filter sections of an antenna duplexer and control the frequency of pass bands for TX and RX which is an important performance requested of the duplexer. As a result, because TX and RX channels necessary for the antenna duplexer of a radio system normally synchronously change, it is possible to obtain a large attenuation value with the number of stages less of antenna duplexers than the number of stages of normal antenna duplexers. Moreover, because a lesser number of stages are used, it is possible to decrease the loss in a pass band and decrease the size of an antenna duplexer. Furthermore, it is possible to obtain a superior characteristic when a strong signal is input by making the DC voltage value of a terminal indeterminate when a switch is turned off.

BRIEF DESCRIPTION OF THE DRAWINGS

FIG. 6 is a characteristic diagram of twofold harmonic for the input signal power of the antenna duplexer of the first embodiment;

DETAILED DESCRIPTION OF THE PREFERRED EMBODIMENTS

The antenna duplexer of the first embodiment of the present invention is described below by referring to the accompanying drawings.

Figure 1:
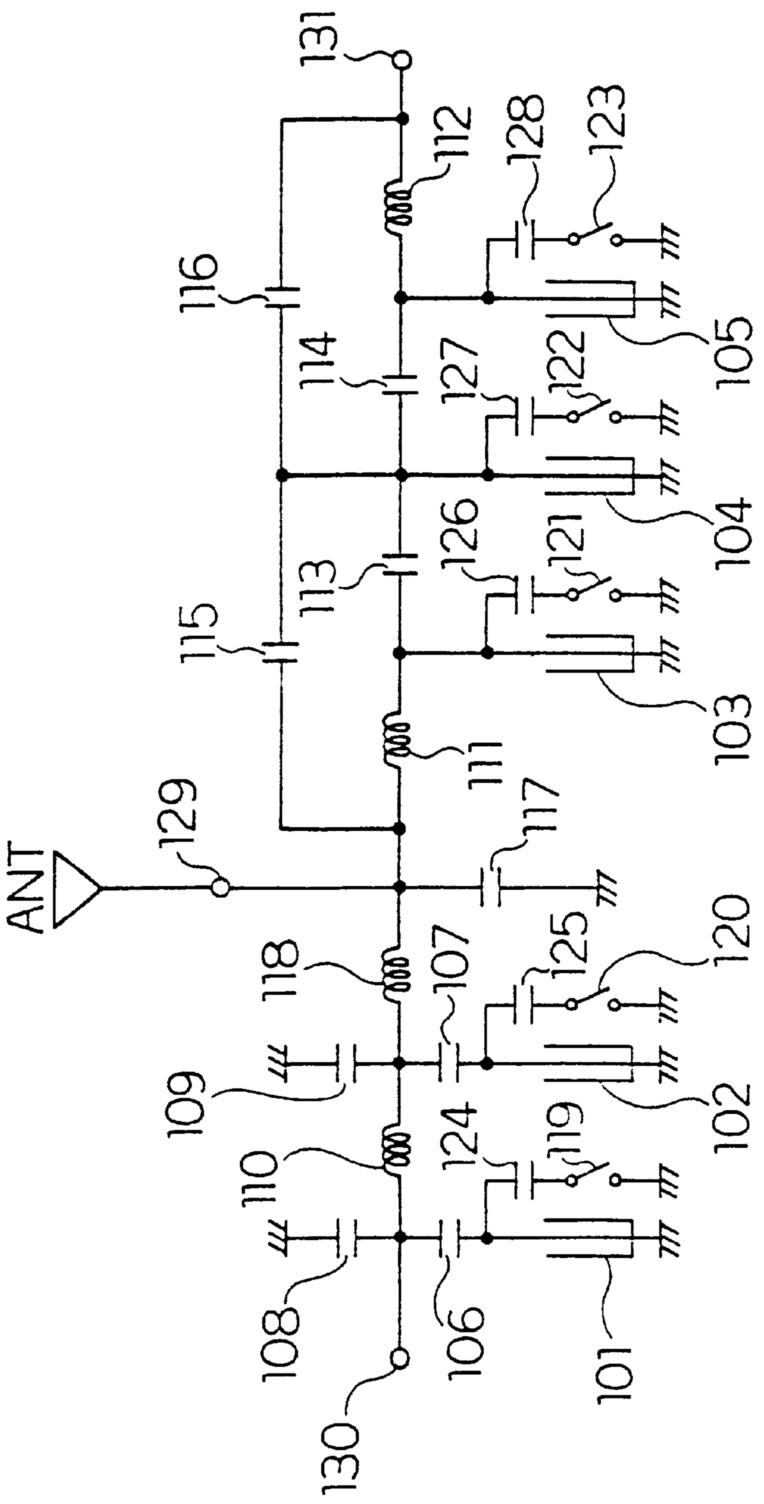
FIG. 1 is a circuit diagram of the antenna duplexer of the first embodiment of the present invention.

FIG. 1 shows a circuit block diagram of the antenna duplexer of the first embodiment of the present invention. In FIG. 1, symbols 101 to 105 denote dielectric coaxial resonators comprising a ¼-wavelength short-ended TX line, 106 and 107 denote series capacitors, 108 and 109 denote grounding capacitors, 110 to 112 denote coupling inductors, 113 and 114 denote coupling capacitors, 115 and 116 denote bypass capacitors, 117 and 118 denote terminal matching capacitors and inductors, 119 to 123 denote switches, 124 to 128 denote switch coupling capacitors, 129 denotes an antenna terminal, 130 denotes a TX terminal, and 131 denotes a RX terminal.

The series capacitors 106 and 107 are connected to the open ends of the dielectric coaxial resonators 101 and 102 and the resonators are coupled by the inductor 110 to constitute a band rejection filter. The grounding capacitors 108 and 109 for controlling harmonics are connected to the both ends of the coupling inductor 110. Moreover, the dielectric coaxial resonators 103, 104, and 105 are connected with each other by the capacitors 113 and 114 and the coupling inductors 111 and 112 for input/output are connected to the open ends of the dielectric coaxial resonators 103 and 105 respectively to constitute a band pass filter. Furthermore, the bypass capacitor 115 getting astride of the coupling elements 111 and 113 and the bypass capacitor 116 getting astride of the coupling elements 112 and 114 form an attenuation pole at the high band side of a pass band. The output end of the TX band rejection filter and the input end of the RX band pass filter are connected to the antenna terminal 129 through the series inductor 118 and parallel capacitor 117 for matching terminals to constitute an antenna duplexer. Furthermore, the switches 119, 120, 121, 122, and 123 are connected to the open ends of the dielectric coaxial resonators 101, 102, 103, 104, and 105 through the switch coupling capacitors 124, 125, 126, 127, and 128 and the other end of every switch is grounded.

Operations of the antenna duplexer thus constituted are described below by referring to FIG. 1 and FIGS. 2(*a*) and 2(*b*).

Figure 2A:
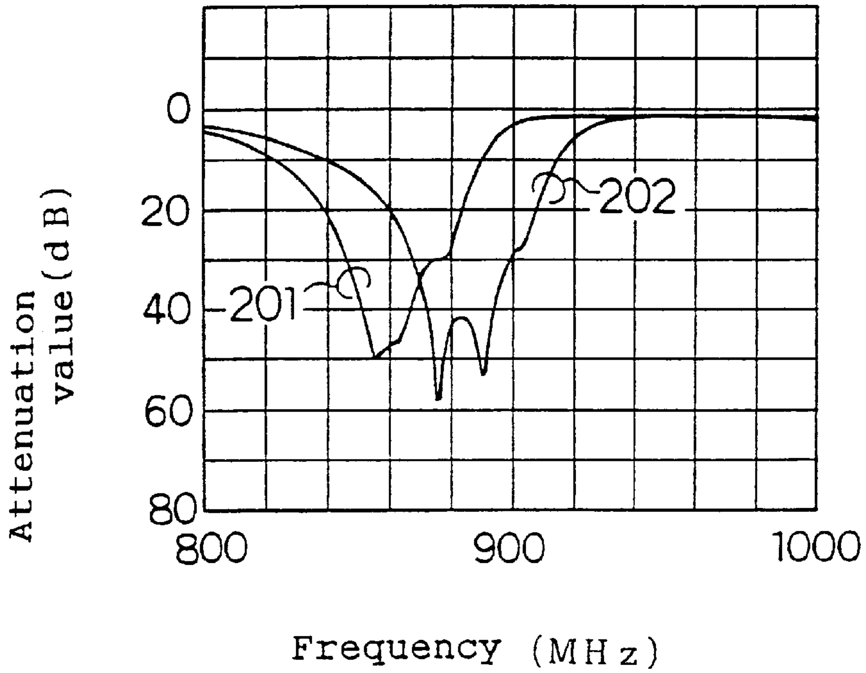
FIGS. 2(*a*) and 2(*b*) are pass characteristics of the antenna duplexer of the first embodiment for explaining operations of the embodiment.
Figure 2B:
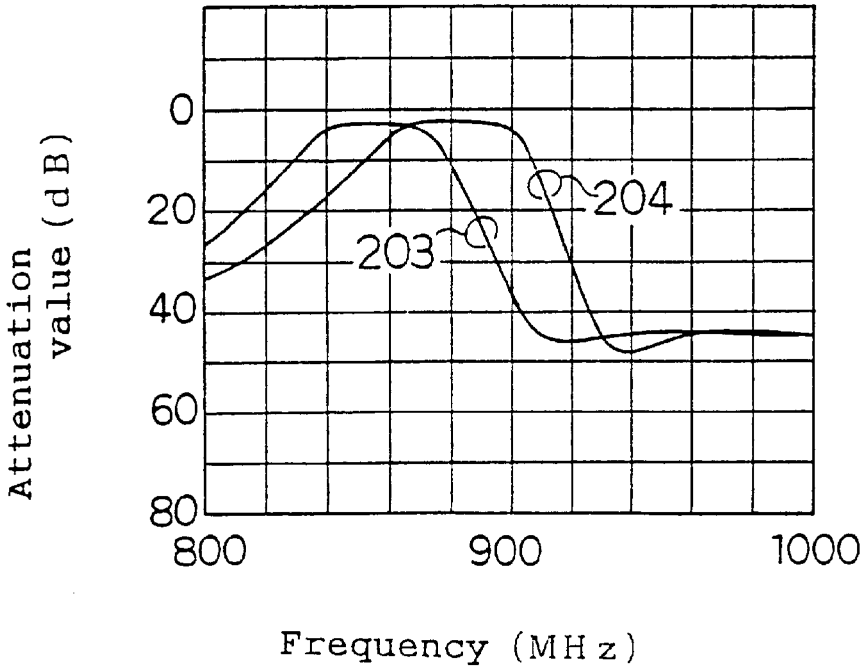

First, FIGS. 2(*a*) and 2(*b*) show the pass characteristics of the antenna duplexer of the first embodiment. FIG. 2(*a*) is the pass characteristic of a TX filter which constitutes a band rejection filter with the dielectric coaxial resonators 101 and 102 and the stage coupling inductor 110 grounded through the series capacitors 106 and 107 on a TX line extending from the TX terminal 130 to the antenna terminal 129 and forms a low pass characteristic, which rejects TX band harmonics with the series inductor 118 and grounding capacitors 108, 109, and 117 connected to the coupling inductor 110 and a filter output end. The inductor 118 and the capacitor 117 also have a function for adjusting an impedance so that a TX-side filter and a RX-side filter do not influence each frequency band in the antenna terminal 129. The TX filter shows a small insertion loss for a TX signal in a TX frequency band and makes it possible to transfer the TX signal from the TX terminal 130 to the antenna terminal 129 almost without attenuating the signal. Moreover, the TX filter shows a large insertion loss for a RX signal in a RX frequency band and an operation that RX signals input through the antenna terminal 129 return to the RX filter because most input signals in the RX frequency band are reflected.

Furthermore, FIG. 2(*b*) is the pass characteristic of a RX filter in which a band pass filter is constituted on a TX line extending from the antenna terminal 129 to the RX terminal 131 with the grounded dielectric coaxial resonators 103, 104, and 105, the stage coupling capacitors 113 and 114, and the input-output coupling inductors 111 and 112, and an attenuation pole is formed with the impedance characteristic of the band pass filter and the impedances of the capacitors 115 and 116 used for a bypass circuit. In the case of FIG. 1, because an inductor is used for coupling of an input and output, the impedance of the bypass circuit becomes equivalently inductive and an attenuation pole is formed at a position where the impedance of the band pass filter is capacitive, that is, in a frequency domain nearby a TX frequency higher than the central frequency of the band pass filter. The RX filter shows a small insertion loss for a RX signal in a RX frequency band and makes it possible to transfer the RX signal from the antenna terminal 129 to the RX terminal 131 almost without attenuating the RX signal. Moreover, the RX filter shows a large insertion loss for a TX signal in a TX frequency band and an operation that TX signals coming through a TX filter are sent to the antenna terminal 129 because most input signals in the TX frequency band are reflected.

Furthermore, a frequency shift circuit constituted with the switch coupling capacitors 124, 125, 126, 127, and 128 for rejecting DC current connected with the switches 119, 120, 121, 122, and 123 whose one ends are grounded in series are connected with the open ends of the dielectric coaxial resonators 101, 102, 103, 104, and 105 in parallel. That is, the resonance frequency of the dielectric coaxial resonators 101 to 105 is determined by the capacitance and inductance components of the dielectric coaxial resonators and the capacitance of a frequency shift circuit when the switches 119 to 123 are turned on or off. When the switches are turned on, the resonance frequency of a resonator is lowered in accordance with the increase of the capacitance component and thereby, the central frequency of a filter is lowered to move the rejection band of a TX filter and the pass band of a RX filter in the direction of lower frequency. Moreover, when the switches are turned off, the resonance frequency of the dielectric coaxial resonators are raised in accordance with the decrease of the capacitance component. Thereby, the central frequency of the filter is raised to move the rejection band of the TX filter and the pass band of the RX filter in the direction of higher frequency. That is, it is possible to synchronously change the rejection band of the TX filter and the pass band of the RX filter.

FIGS. 2(*a*) and 2(*b*) show relations between the pass characteristics of a TX filter and a RX filter for a frequency of 800 to 1000 MHz in accordance with the above structure. Symbol 201 in FIG. 2(*a*) and symbol 203 in FIG. 2(*b*) are pass characteristics when a switch is turned on. By turning off the switch, 202 in FIG. 2(*a*) and 204 in FIG. 2(*b*) are obtained. Thus, the frequencies of the TX-side rejection band and the RX-side pass band of an antenna duplexer are synchronously changed by changing the switches.

Figure 3:
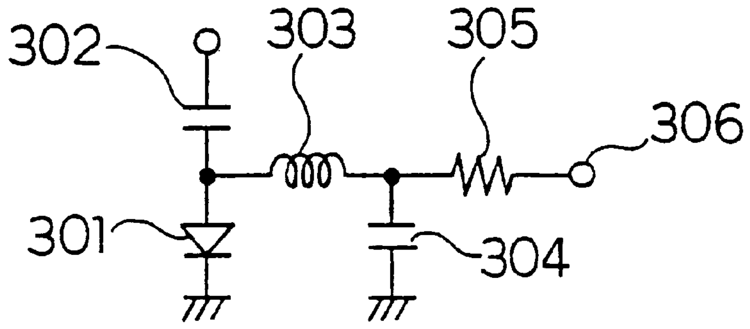
FIG. 3 is a block diagram of the shift circuit of the first embodiment using a PIN diode.

The circuit using a PIN diode shown in FIG. 3 is listed as a specific circuit structure used for the switches 119 to 123. Symbol 301 denotes the PIN diode which constitutes a frequency shift circuit by connecting with a coupling capacitor 302 (corresponding to 124 to 128 in FIG. 1) for rejecting DC current in series. A shift voltage for changing bands is applied to the connection point between the switching element 301 and the coupling capacitor 302 from a control terminal 306 through a resistance 305, bypass capacitor 304, and choke coil 303 so that control can be made. The shift voltage supplied from the control terminal 306 turns on/off the PIN diode 301. By applying a certain voltage higher than the bias voltage supplied to the cathode side to the PIN diode, the PIN diode is turned on because a forward DC current flows through the diode and has a very small resistance value. Symbol 305 denotes a resistance for controlling a current value when the PIN diode is turned on. However, by applying 0 V or a reverse bias voltage to the PIN diode, the forward current does not flow through the diode and the diode has a very large resistance and it is turned off.

Figure 4:
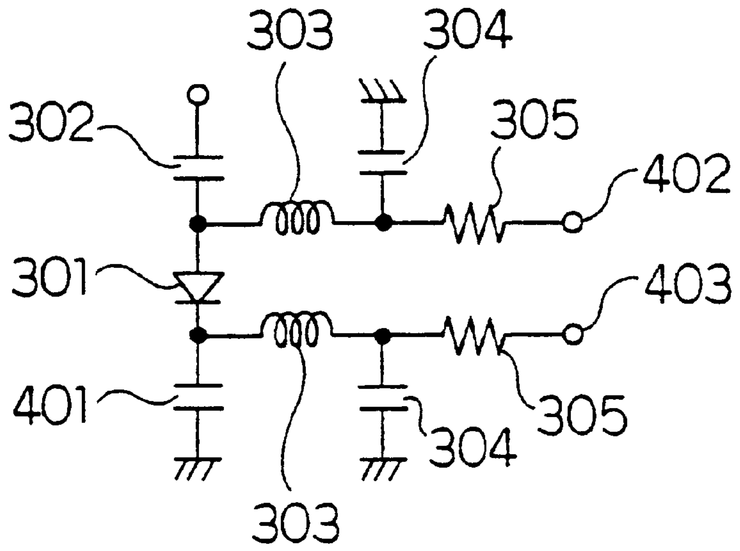
FIG. 4 is a block diagram of the shift circuit of the first embodiment using a PIN diode.

In this case, because a TX signal having a strong power passes through an antenna duplexer, the power resistant characteristic is also an important factor. By setting the bias voltage to 0 V in the structure in FIG. 3 when the PIN diode is turned off, the pass band characteristic of a filter is degraded due to a TX signal power. This is because the PIN diode 301 is instantaneously turned on due to the power leaking to the anode terminal side of the PIN diode when a strong input is supplied and some of signal components are detected and a DC voltage is generated on the anode terminal. This voltage passes through the control terminal 306 and flows to earth and resultingly, the phenomenon that the loss of signal components increases. To prevent the phenomenon, by applying a reverse bias voltage to the control terminal 306, detection current can be limited. Moreover, by using the structure for applying a bias voltage to the both sides of the diode 301 as shown in FIG. 4, it is possible to supply a reverse bias to the diode when it is turned off without using a negative power supply by applying a positive voltage to a control terminal 402 when the diode is turned on and a positive voltage to a control terminal 403 when the diode is turned off. However, to completely control the degradation phenomenon, it is necessary to apply a considerably large reverse bias voltage. Therefore, by separating the control terminal 306 to set a DC voltage indeterminate state, that is, an open state when the diode is turned off, the above detection current does not flow at all and therefore, loss degradation does not occur, and the duplexer characteristic when a strong input is supplied is greatly improved.

Figure 5:
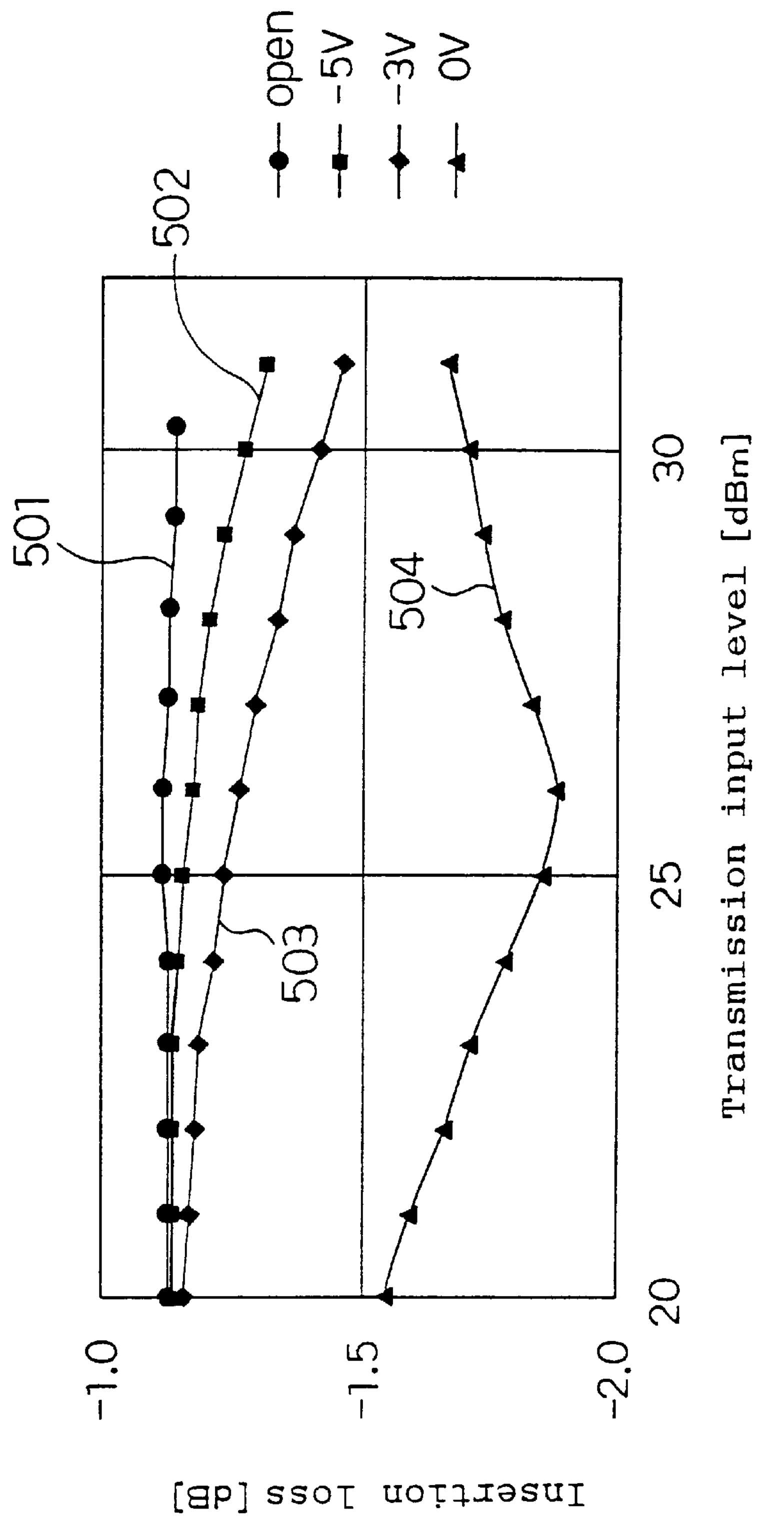
FIG. 5 is a characteristic diagram of an insertion loss for the input signal power of the antenna duplexer of the first embodiment.

FIG. 5 is an experimental result showing the effect, which shows the degradation value of a TX filter insertion loss to an input power level. Symbol 501 denotes the characteristic when opening a control terminal. Symbols 502, 503, and 504 denote the characteristics when setting a reverse bias voltage to −5 V, −3 V, and 0 V. From FIG. 5, it is found that the degradation value of insertion loss when a strong input is supplied is improved under open control.

Figure 7:
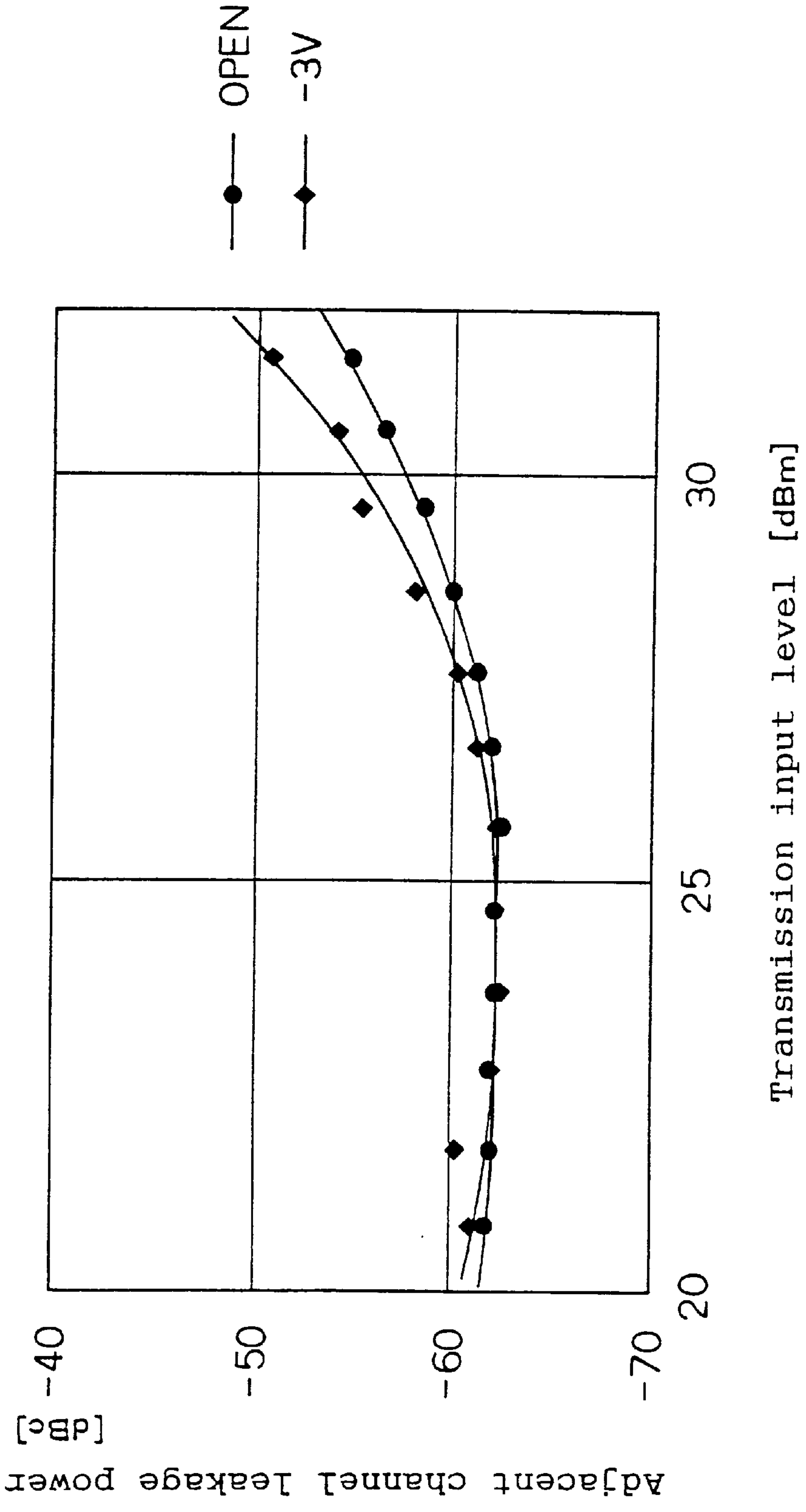
FIG. 7 is a characteristic diagram of adjacent-channel leakage power for the input signal power of the antenna duplexer of the first embodiment.
Figure 8:
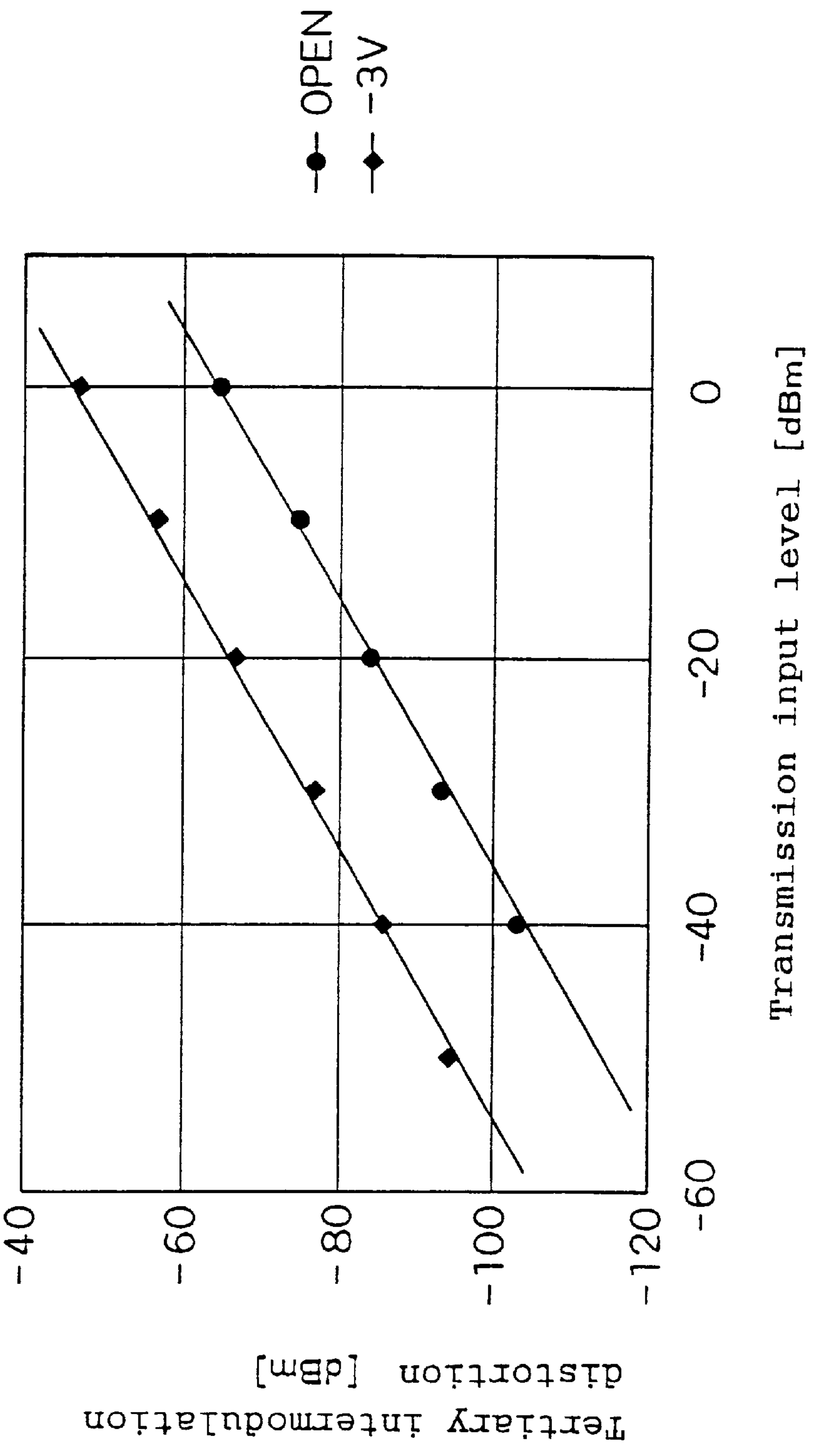
FIG. 8 is a characteristic diagram of tertiary intermodulation distortion for the input signal power of the antenna duplexer of the first embodiment.

Moreover, a control method for opening a control terminal when the diode is turned off is effective for not only improvement of degradation of insertion loss but also improvement of distortion characteristics because the operation theory of the open control method uses a function of reduction of a PIN diode nonlinear phenomenon. FIGS. 6, 7 and 8 show a harmonic characteristic, adjacent channel leakage power characteristic, and tertiary intermodulation distortion when the diode is turned off. From FIGS. 6, 7, and 8, it is found that the characteristic under open control is greatly superior to the characteristic when applying a reverse bias voltage of −3 V in any case. The characteristic in FIG. 8 shows values obtained by keeping one input signal constant at a level of 30 dBm from a TX end, making the other input signal variable by inputting it through an antenna terminal, and measuring a signal level appearing at a RX terminal.

In this case, under a waiting state in which no TX signal is output, it is necessary to reduce the current consumption of an antenna duplexer as much as possible because the entire current consumption of a communication unit is small. Therefore, there is no problem on practical use even by keeping a switch for controlling a TX band turned off because no TX filter is used under a waiting state and thereby, the current consumption under the waiting state can be reduced.

Moreover, when switching a PIN diode from turned-on to turned-off states and simultaneously instantaneously switching a positive voltage applying state to a voltage indeterminate state, electric charges left at the anode side of the diode are not immediately discharged but they are discharged with a certain time constant, and as a result, the switching speed of a switch may be lowered. In this case, by instantaneously performing grounding or, on the contrary, applying a reverse bias voltage when switching the control to the voltage indeterminate state, the electric charges left in the anode are instantaneously discharged and thereby, the switching speed can be prevented from lowering.

Figure 9:
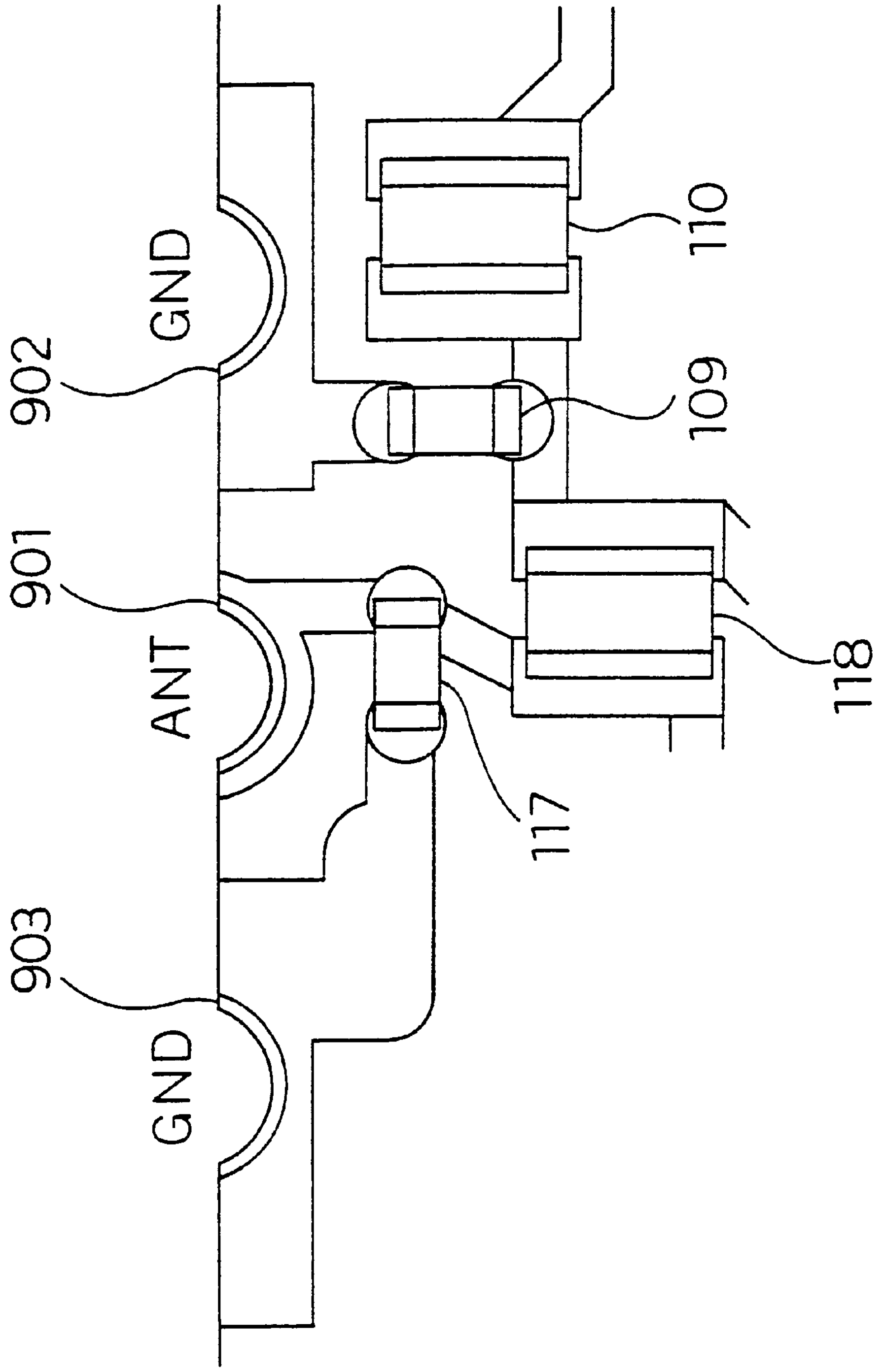
FIG. 9 is a circuit board mounting diagram nearby the antenna terminal of the first embodiment.

Furthermore, a TX filter has a circuit structure obtained by combining a band rejection filter with a low pass filter and it is necessary to ground one end of the coupling capacitors 109 and 117 constituting a low pass filter. However, when connecting their ends to a common grounding terminal, the ends are electrically connected with each other through an grounding electrode and the attenuation characteristic of the low pass filter is degraded. FIG. 9 is a duplexer circuit board mounting diagram nearby an antenna terminal, and a common element to that in FIG. 1 is provided with the same number. Symbol 901 denotes an antenna terminal, 902 denotes a grounding terminal in the direction of the TX side adjacent to the antenna terminal, and 903 denotes a grounding terminal in the direction of the RX side adjacent to the antenna terminal. As shown in FIG. 9, by connecting the capacitors 109 and 117 to the grounding terminals 902 and 903 separated by the antenna terminal 901, it is possible to greatly reduce the electrical couplings through the grounding electrode and improve the attenuation characteristic of a filter. Moreover, by forming grounding electrodes separate from each other and grounding the capacitors 109 and 117 to these electrodes, the same effect can be obtained.

Figure 10:
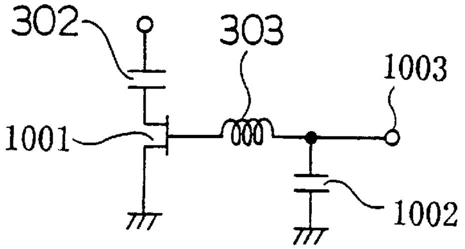
FIG. 10 is a block diagram of the shift circuit of the first embodiment using an FET.

The switching elements 119 to 123 can respectively use a transistor in addition to the PIN diode. For example, FIG. 10 shows a case of using a field effect transistor (FET) 1001 as a switching element. The gate electrode of the FET is connected to a control terminal 1003 through a bypass capacitor 1002. Because the FET is a voltage control element, the current consumption such as a diode is used does not occur and therefore, it is effective to reduce current consumption. Moreover, by using a varactor diode as a switching element, it is possible to continuously change bands.

As described above, according to this embodiment, it is possible to synchronously control the rejection band of the TX filter and the pass band of the RX filter of an antenna duplexer in accordance with an externally applied voltage and obtain an attenuation value without increasing the number of stages of filters even when obtaining a slightly wide band. Moreover, because the number of stages is decreased, a loss is reduced. Thereby, the size of an antenna duplexer can be decreased. Furthermore, by opening a control terminal when a switch is turned off, it is possible to prevent the characteristic when a strong power signal is input from deteriorating.

The antenna duplexer of the second embodiment of the present invention is described below by referring to the accompanying drawings.

Figure 11:
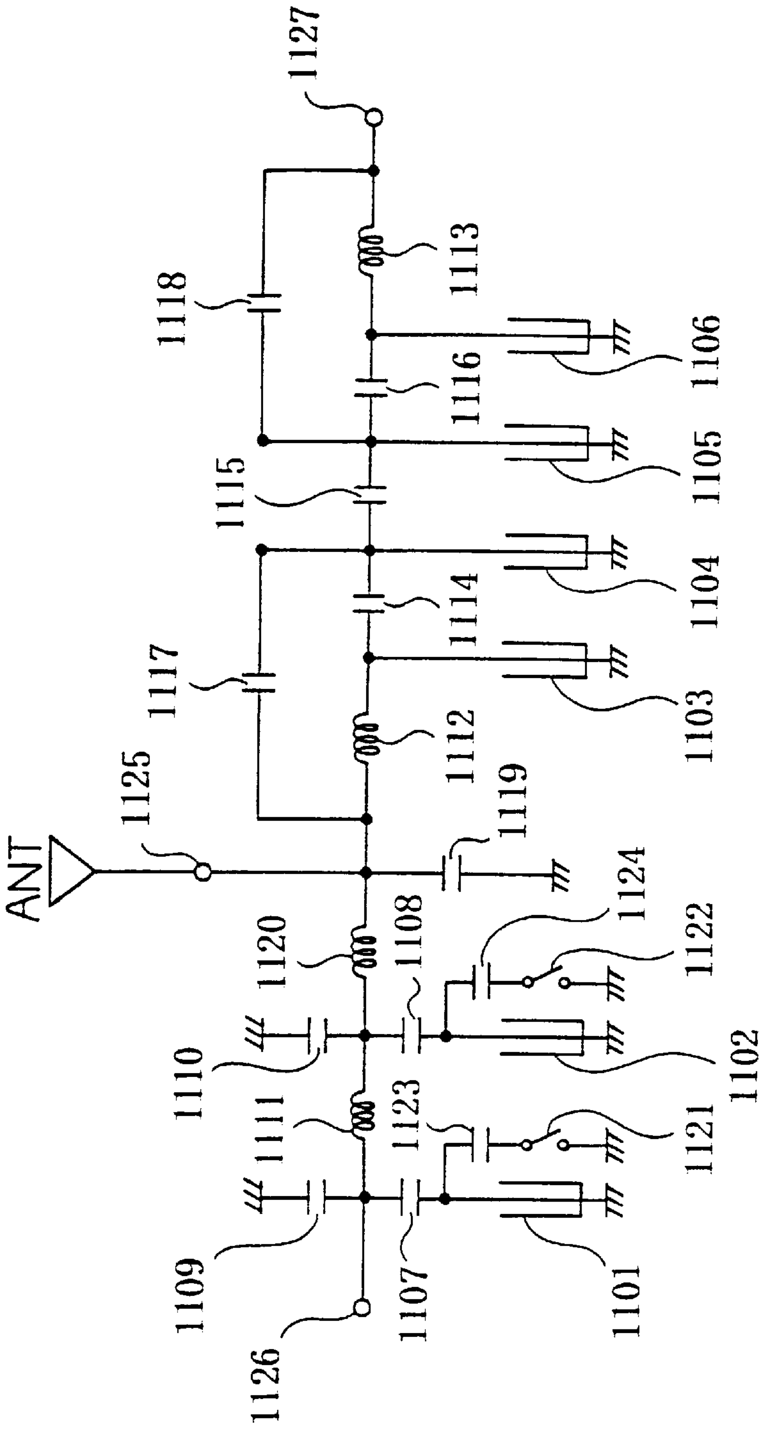
FIG. 11 is a circuit block diagram of the antenna duplexer of the second embodiment of the present invention.

FIG. 11 shows a circuit block diagram of the antenna duplexer of the second embodiment of the present invention. In FIG. 11, symbols 1101 to 1106 denote dielectric coaxial resonators constituted with a ¼-wavelength short-ended TX line, 1107 and 1108 denote series capacitors, 1109 and 1110 denote grounding capacitors, 1111 to 1113 denote coupling inductors, 1114 to 1116 denote coupling capacitors, 1117 and 1118 denote bypass capacitors, 1119 and 1120 denote terminal-matching capacitors and inductors, 1121 and 1122 denote switches, 1123 and 1124 denote switch coupling capacitors, 1125 denotes an antenna terminal, 1126 denotes a TX terminal, and 1127 denotes a RX terminal.

The series capacitors 1107 and 1108 are connected to the open ends of the dielectric coaxial resonators 1101 and 1102 to constitute a band rejection filter by coupling the resonators by the inductor 1111. The grounding capacitors 1109 and 1110 for reducing harmonics are connected to both ends of the coupling inductor 1111. Moreover, the dielectric coaxial resonators 1103, 1104, 1105, and 1106 are coupled with each other by the capacitors 1114, 1115, and 1116 to constitute a RX band pass filter by connecting the input-output coupling inductors 1112 and 1113 to the open ends of the dielectric coaxial resonators 1103 and 1106. Moreover, an attenuation pole is formed with the bypass capacitors 1117 getting astride of the coupling elements 1112 and 1114 and the bypass capacitor 1118 getting astride of the coupling elements 1113 and 1116 at the high band side in a pass band. The output end of the band rejection filter and the input end of the band pass filter are connected to the antenna terminal 1125 through the terminal-matching series inductor 1120 and parallel capacitor 1119 to constitute an antenna duplexer. Furthermore, the switches 1121 and 1122 are connected to the open ends of the dielectric coaxial resonators 1101 and 1102 through the switch coupling capacitors 1123 and 1124 and the other end of every switch is grounded.

Operations of the antenna duplexer thus constituted are described below by referring to FIGS. 11 and 12.

Figure 12:
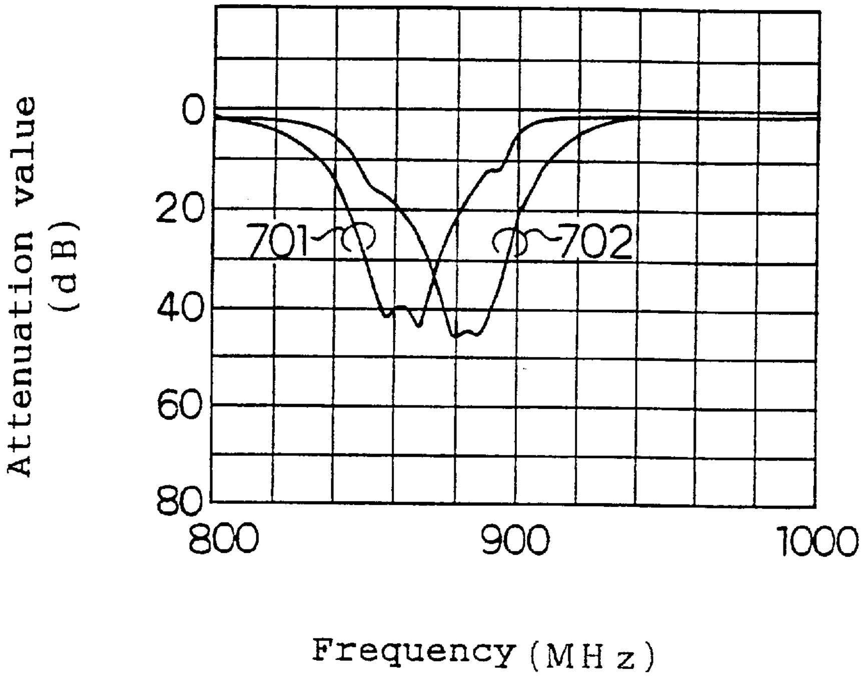
FIGS. 12(*a*) and 12(*b*) are pass characteristic diagrams of the antenna duplexer of the second embodiment for explaining operations of the embodiment.
Figure 12B:
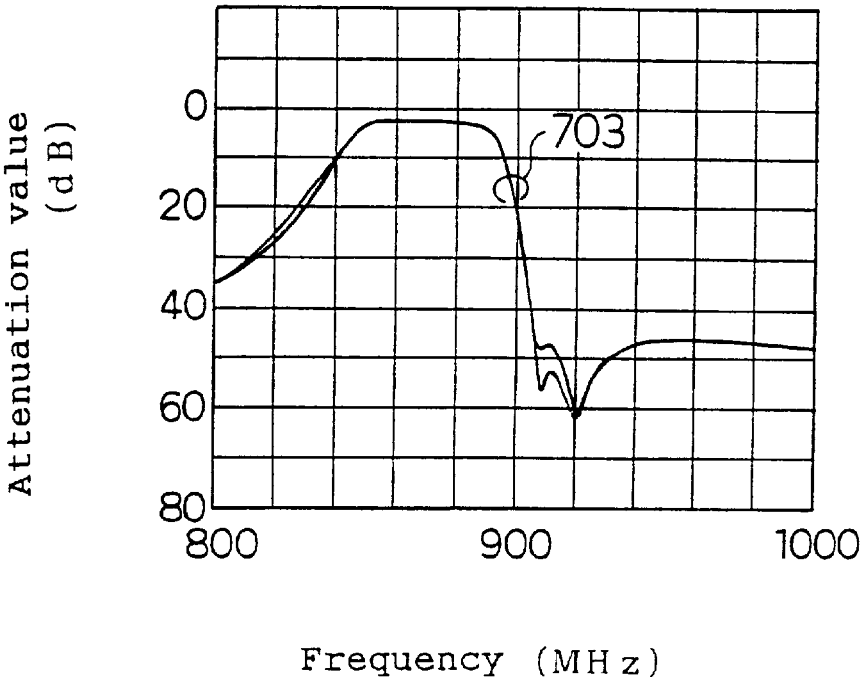
Figure 13:
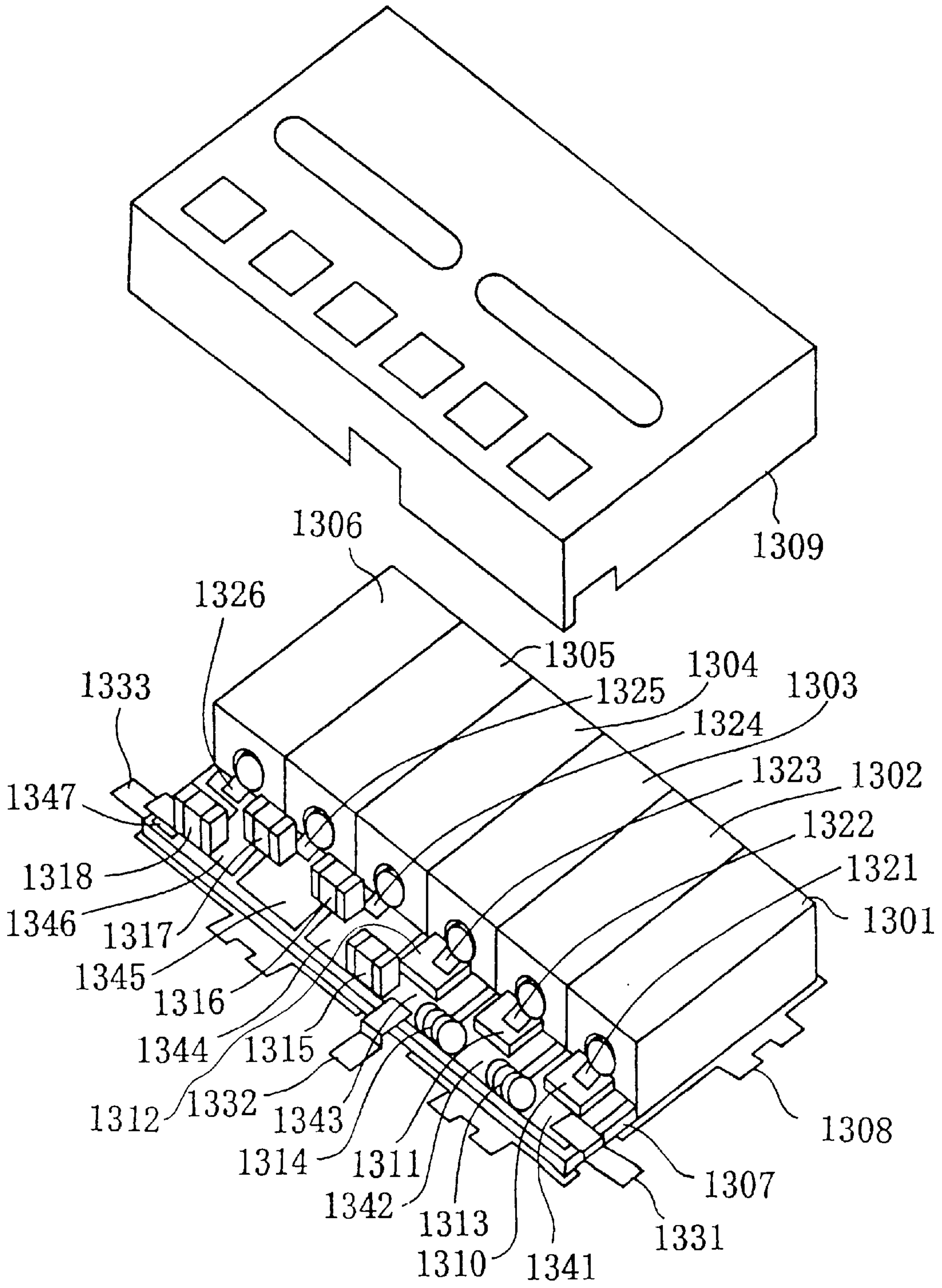
Fig. 13 PRIOR ART
FIG. 13 is an exploded perspective view of a conventional antenna duplexer.

First, FIGS. 12(*a*) and 12(*b*) show the pass characteristics of the antenna duplexer of the second embodiment of the present invention. FIG. 12(*a*) shows the pass characteristic of a TX filter, in which constitutes a band rejection filter with the dielectric coaxial resonators 1101 and 1102 and the stage-coupling inductor 1111 grounded through the series capacitors 1107 and 1108 on a TX line extending from the TX terminal 1126 to the antenna terminal 1125 and forming a low pass characteristic, which rejects TX band harmonics with the series inductor 1120 and grounding capacitors 1109, 1110, and 1119 connected to the coupling inductor 1111 and the filter output end. The inductor 1120 and the capacitor 1119 also have a function for adjusting impedance so that the TX filter and RX filter of the antenna terminal 1125 do not interfere each other in their frequency bands. The TX filter shows a small insertion loss for a TX signal in a TX frequency band serving as a pass band and makes it possible to transfer the TX signal from the TX terminal 1126 to the antenna terminal 1125 almost without attenuating the TX signal. Moreover, the TX filter shows a large insertion loss for a RX signal in a RX frequency band and an operation that a RX signal input through the antenna terminal 1125 returns to a RX filter because most input signals in the RX frequency band are reflected.

Furthermore, FIG. 12(*b*) is the pass characteristic of a RX filter in which a band pass filter is constituted with the grounded dielectric coaxial resonators 1103, 1104, 1105, and 1106, the stage-coupling capacitors 1114, 1115, and 1116, and the input-output coupling inductors 1112 and 1113 on a TX line extending from the antenna terminal 1125 to the RX terminal 1127 and an attenuation pole is formed with the impedance characteristic of the band pass filter and the impedances of the capacitors 1117 and 1118 used for a bypass circuit. In the case of FIG. 11, because an inductor is used for coupling of input and output, the impedance of the bypass circuit becomes equivalently inductive and an attenuation pole is formed at a position where the impedance of the band pass filter is capacitive, that is, in a frequency domain higher than the central frequency of the band pass filter. The RX filter shows a small insertion loss for a RX signal in a RX frequency band and makes it possible to transfer the RX signal from the antenna terminal 1125 to the RX terminal 1127 almost without attenuating the RX signal. Moreover, the RX filter shows a large insertion loss for a TX signal in a TX frequency band and an operation that the TX signal coming through a TX filter is sent out to the antenna terminal 1125 because most input signals in the TX frequency band are reflected.

Furthermore, a frequency shift circuit constituted by connecting the switch coupling capacitors 1123 and 1124 for rejecting DC current with the switches 1121 and 1122 whose one ends are grounded in series is connected to the open ends of the dielectric coaxial resonators 1101 and 1102 in parallel. That is, the resonance frequency of the dielectric coaxial resonators 1101 and 1102 is determined by the capacitance and inductance components of the dielectric coaxial resonators and the capacitance of a frequency shift circuit when the switch 1121 or 1122 is turned on or off. When the switch is turned on, the resonance frequency of the resonators is lowered in accordance with the increase of the capacitance component and thereby, the central frequency of a filter is lowered to move the rejection band of a TX filter in the direction of lower frequency. Moreover, when the switch is turned off, the resonance frequency of the dielectric coaxial resonators is raised in accordance with the decrease of the capacitance component. Thereby, the central frequency of a filter is raised to move the pass band in the rejection band of the TX filter in the direction of higher frequency. That is, it is possible to change only the rejection band of the TX filter while fixing the pass band characteristic of the RX filter. Thereby, though the number of stages of RX filters increases and the insertion loss increases compared to the case of the first embodiment, it possible to decrease the current consumption of shift circuits because the number of shift circuits decreases.

FIGS. 12(*a*) and 12(*b*) show the results of examining the relation between the pass characteristics of a TX filter and a RX filter for a frequency of 800 to 1000 MHz in accordance with the above structure. Symbol 701 in FIG. 12(*a*) denotes the pass characteristic of the TX filter when a switch is turned on and 702 denotes the characteristic when the switch is turned off. Moreover, the reception filter shows a pass characteristic 703 in FIG. 12(*b*) independently of operations of switches. Thus, only frequencies in the rejection band of the TX filter of an antenna duplexer are changed by changing switches.

Furthermore, circuit structures of the switches 1121 and 1122 can use the PIN diodes shown in FIGS. 3 and 4, the FET shown in FIG. 10, or a varactor diode similarly to the case of the first embodiment. In this case, the same advantage as that of the first embodiment can be obtained.

As described above, this embodiment makes it possible to obtain an attenuation value without increasing the number of stages of filters similarly to the case of the first embodiment by controlling only the rejection band of the TX filter of an antenna duplexer with an externally applied voltage.

Moreover, a loss is decreased because a lesser number of stages can be used. Thereby, it is possible to decrease the size of an antenna duplexer. Furthermore, by opening a control terminal when a switch is turned off, it is possible to prevent the characteristic when a strong power signal is input from deteriorating. Furthermore, it is possible to decrease the current consumption at RX.

In the case of the first and second embodiments, the resonator uses a dielectric coaxial resonator. However, it is also possible to use a strip line resonator. Moreover, though a band rejection filter is used for the TX side and a band pass filter is used for the RX side, various modifications of the structures of a TX filter and a RX filter are self-evident and it is needless to say that the modifications are included in the range of the present invention.

Furthermore, though a case is described in which a switching circuit is used for an antenna duplexer in the case of the first and second embodiments, a control system, particularly means for improving the degradation of the strong input characteristic of a filter under a DC voltage indeterminate state when a PIN diode is turned off can be also applied to a filter or switching circuit for controlling a pass characteristic by using a PIN diode in addition to an antenna duplexer.

Furthermore, in the case of the first and second embodiments, a capacitor is used to connect a resonance element with an impedance variable element in parallel. However, it is also possible to use an inductor.

The present invention has a wide TX pass band and a wide RX pass band and moreover, it is most effective for a communication unit for a system having a very small interval between the TX pass band and the RX pass band. PCS, E-GSM, and Japanese CDMA correspond to the communication unit. For example, the TX pass band and the RX pass band are respectively divided into two parts with a mutually-corresponding band width to form a TX Low band, TX High band, RX Low band, and RX High band. By providing the two respective divided bands for a control signal, a TX band and a RX band are synchronously switched to make RX Low correspond to TX Low and RX High correspond to TX High. Thereby, a TX-RX frequency interval under operation equivalently increases and it is possible to secure an attenuation value without increasing the number of stages of filters. Moreover, by selecting a band in which a channel used is present in accordance with the control signal, it is possible to cover every TX pass band and every RX pass band. Furthermore, it is a matter of course that the structure of the present invention can be used for other TDMA and CDMA systems.

What is claimed is:

1. An antenna duplexer comprising a transmission input terminal, a receiving output terminal, an antenna terminal in which a transmission output terminal and a receiving input terminal are used in common, a transmission filter having plural resonance elements set between said transmission input terminal and said transmission output terminal and coupled by a coupling element, a receiving filter having plural resonance elements set between said receiving output terminal and said receiving input terminal and coupled by a coupling element, and plural impedance variable elements individually responsive to control signals, said impedance variable elements including a first plurality thereof and a second plurality thereof, each said impedance variable element of said first plurality thereof being connected to an associated one of said resonance elements of said transmission filter and each said impedance variable element of said second plurality being connected to an associated one of said resonance elements of said receiving filter whereby each resonance element of said transmission filter and each resonance element of said receiving filter is connected to one of said impedance variable elements, each such connected impedance variable element and resonance element being connected in parallel, wherein the frequency transfer characteristic of said transmission filter and the frequency transfer characteristic of said receiving filter are controlled by applying control signals to thereby change the impedance of each of said impedance variable elements individually, and to thereby change the resonance frequency of each of said resonance elements individually.

2. The antenna duplexer according to claim 1, wherein the frequency transfer characteristic of said transmission filter and the frequency transfer characteristic of said receiving filter are synchronously controlled.

3. The antenna duplexer according to claim 2, wherein each impedance variable element includes a switching element with a PIN diode and a control terminal for turning said diode on and off, and wherein said control signals selectively set said control terminal to a positive DC voltage applied state and and to a DC voltage value indeterminate state.

4. The antenna duplexer according to claim 3, wherein, in the case of logical structures of said control signals, a voltage of 0 or a negative voltage is applied temporarily when changing a positive voltage applied state to a voltage value indeterminate state.

5. A communicating unit comprising a pass characteristic control filter or a signal switching circuit using said switching element of claim 3.

6. The antenna duplexer according to claim 1, wherein control logic of the transmission side and control logic of the receiving side are independently controlled under a waiting state in which no transmission signal is transmitted.

7. The antenna duplexer according to claim 6, wherein logic for said control signals is set so that the transmission side is brought into a DC voltage value indeterminate state and the receiving side is brought into a positive DC voltage applied state and other logic for said control signals is set so that the receiving and transmission sides are brought into a DC voltage value indeterminate state under a waiting state in which no transmission signal is transmitted.

8. The antenna duplexer according to claim 6, wherein logic for said control signals is set so that the transmission side is brought into a positive DC voltage applied state and other logic is set so that the receiving and transmission sides are brought into a grounded state under a waiting state in which no transmission signal is transmitted.

9. The antenna duplexer according to claim 1, wherein the frequency transfer characteristic of said transmission filter is the band rejection type and the frequency transfer characteristic of said receiving filter is the band pass type.

10. The antenna duplexer according to claim 9, wherein the frequency transfer characteristic of said transmission filter has the band rejection type and low pass type at the same time.

11. The antenna duplexer according to claim 10, wherein one-side terminals of a plurality of capacitive elements forming said low-pass-type frequency transfer characteristic are individually connected to a plurality of independent grounding terminals.

12. The antenna duplexer according to claim 11, wherein said plurality of grounding terminals are formed at the both sides of the antenna terminal.

13. The antenna duplexer according to claim 1, wherein said impedance variable element uses a PIN diode.

14. The antenna duplexer according to claim 13, wherein a control terminal is set to both ends of said PIN diode.

15. The antenna duplexer according to claim 1, wherein said impedance variable element uses a field effect transistor (FET).

16. The antenna duplexer according to claim 1, wherein said impedance variable element uses a varactor diode.

17. The antenna duplexer according to claim 1, wherein said resonance elements use a dielectric coaxial resonator.

18. The antenna duplexer according to claim 1, wherein said resonance elements use a strip line resonator.

19. A communication unit comprising said antenna duplexer of claim 1 and a signal processing circuit connected to said antenna duplexer.

20. An antenna duplexer comprising a transmission input terminal, a receiving output terminal, an antenna terminal in which a transmission output terminal and a receiving input terminal are used in common, a receiving filter having plural resonance elements set between said receiving output terminal and said receiving input terminal and coupled by a coupling element, and a transmission filter having plural resonance elements set between said transmission input terminal and said transmission output terminal, a coupling element coupling said resonance elements, and plural impedance variable elements individually responsive to control signals, each impedance variable element being connected to an associated one of said resonance elements of said transmission filter such that each resonance element is connected to one of said impedance variable elements, each connected impedance variable element and resonance element being connected in parallel, wherein the frequency transfer characteristic of only said transmission filter is controlled by applying control signals to said impedance variable elements to thereby change the impedance of each of said impedance variable elements individually, and to thereby change the resonance frequency of each of said resonance elements individually.

21. The antenna duplexer according to claim 20, wherein each impedance variable element includes a switching element with a PIN diode and a control terminal for turning said diode on and off, and wherein said control signals selectively set said control terminal to a positive DC voltage applied state and and to a DC voltage value indeterminate state.

22. An antenna duplexer comprising a band rejection filter constituted by connecting a capacitive element to each open end of a plurality of dielectric coaxial resonators respectively constituted with a ¼-wavelength short-ended transmission line and connecting the other ends of said capacitive elements to each other by an inductance coupling element, and a polarized band pass filter constituted by connecting open ends of a plurality of dielectric coaxial resonators respectively constituted with a ¼-wavelength short-ended transmission line to each other by a capacity coupling element and forming a bypass circuit getting astride of said dielectric coaxial resonators and said capacity coupling element; wherein the output end of said band rejection filter is connected with the input end of said polarized band pass filter to form a common terminal, a frequency shift circuit constituted by connecting a coupling capacitor with a switching element in series is connected to the open end or ends of one or more dielectric coaxial resonator or resonators of said band rejection filter and said polarized band pass filter in parallel to apply an externally applied voltage to said frequency shift circuit through at least a resistance, choke coil, and bypass capacitor and thereby change synchronously the rejection bands of said band rejection filter and said polarized band pass filter.

23. An antenna duplexer comprising a band rejection filter constituted by connecting a capacitive element to each open end of a plurality of dielectric coaxial resonators respectively constituted with a ¼-wavelength short-ended transmission line and connecting the other ends of said capacitive elements to each other by an inductance coupling element, and a polarized band pass filter constituted by connecting open ends of a plurality of dielectric coaxial resonators respectively constituted with a ¼-wavelength short-ended transmission line to each other by a capacity coupling element and forming a bypass circuit getting astride of said dielectric coaxial resonators and said capacity coupling element; wherein the output end of said band rejection filter is connected with the input end of said polarized band pass filter to form a common terminal, a frequency shift circuit constituted by connecting a coupling capacitor with a switching element in series is connected to the open end or ends of one or more dielectric coaxial resonator or resonators of said band rejection filter in parallel to apply an externally applied voltage to said frequency shift circuit through at least a resistance, choke coil, and bypass capacitor and thereby change rejection bands of said band rejection filter.

* * * * *